(12) United States Patent
Tamura et al.

(10) Patent No.: US 9,237,096 B2
(45) Date of Patent: Jan. 12, 2016

(54) NETWORK RELAY APPARATUS

(71) Applicant: ALAXALA Networks Corporation, Kanagawa (JP)

(72) Inventors: Kazuyuki Tamura, Machida (JP); Tsuyoshi Katou, Odawara (JP)

(73) Assignee: ALAXALA NETWORKS CORPORATION, Kanagawa (JP)

( * ) Notice: Subject to any disclaimer, the term of this patent is extended or adjusted under 35 U.S.C. 154(b) by 179 days.

(21) Appl. No.: 13/713,038

(22) Filed: Dec. 13, 2012

(65) Prior Publication Data

US 2013/0156037 A1 Jun. 20, 2013

(30) Foreign Application Priority Data

Dec. 19, 2011 (JP) ................................ 2011-277257
Oct. 29, 2012 (JP) ................................ 2012-238102

(51) Int. Cl.
*H04L 12/773* (2013.01)
*H04L 12/933* (2013.01)
*H04L 12/935* (2013.01)

(52) U.S. Cl.
CPC ............... *H04L 45/60* (2013.01); *H04L 49/15* (2013.01); *H04L 49/30* (2013.01)

(58) Field of Classification Search
None
See application file for complete search history.

(56) References Cited

U.S. PATENT DOCUMENTS

| | | | |
|---|---|---|---|
| 6,141,326 A | 10/2000 | Minami | |
| 6,842,034 B1 * | 1/2005 | Chan et al. | 326/8 |
| 7,257,750 B1 | 8/2007 | Singh et al. | |
| 7,295,528 B2 * | 11/2007 | Ibrahim et al. | 370/310 |
| 7,546,404 B2 * | 6/2009 | Yeh et al. | 710/117 |
| 8,085,734 B2 * | 12/2011 | Faber | 370/334 |
| 8,213,344 B2 * | 7/2012 | Zhu et al. | 370/278 |
| 8,244,944 B1 * | 8/2012 | Wong et al. | 710/240 |
| 8,301,192 B2 * | 10/2012 | Kakitsu et al. | 455/553.1 |
| 8,615,270 B2 * | 12/2013 | Ibrahim et al. | 455/552.1 |
| 2002/0080771 A1 * | 6/2002 | Krumel | 370/352 |
| 2003/0026525 A1 * | 2/2003 | Alvarez | 385/16 |
| 2003/0118058 A1 * | 6/2003 | Kim et al. | 370/535 |
| 2004/0029619 A1 * | 2/2004 | Liang et al. | 455/562.1 |
| 2004/0042396 A1 * | 3/2004 | Brown et al. | 370/227 |
| 2005/0025177 A1 * | 2/2005 | Huckett et al. | 370/466 |
| 2005/0084269 A1 * | 4/2005 | Dallesasse et al. | 398/135 |
| 2005/0240745 A1 * | 10/2005 | Iyer et al. | 711/167 |
| 2006/0276132 A1 * | 12/2006 | Sheng-Fuh et al. | 455/41.2 |
| 2007/0050689 A1 | 3/2007 | Sasakura | |

(Continued)

FOREIGN PATENT DOCUMENTS

JP 2007-58419 A 3/2007
JP 2010-166488 A 7/2010

*Primary Examiner* — Christopher Crutchfield
(74) *Attorney, Agent, or Firm* — Mattingly & Malur, PC

(57) ABSTRACT

The network relay apparatus is provided. The network relay apparatus includes: a main controller; a relay processor; and, a network interface unit configured to include: a plurality of line interfaces to which physical lines are respectively connected and send and receive a packet to and from outside of the network relay apparatus; a data storage configured to store circuit data; a programmable logic device by with a logic circuit having a predetermined function is realized; a configuration circuit configured to direct the programmable logic device to configure the logic circuit using the circuit data; and a state controller provided in a circuit structure other than the programmable logic device to control state of each of the plurality of line interfaces to one of an active state which allows data transmission and reception and a standby state which prohibits data transmission and reception.

10 Claims, 7 Drawing Sheets

(56) References Cited

U.S. PATENT DOCUMENTS

| | | |
|---|---|---|
| 2007/0178839 A1* | 8/2007 | Rezvani et al. .................. 455/62 |
| 2007/0280258 A1* | 12/2007 | Rajagopalan et al. ..... 370/395.3 |
| 2008/0080543 A1* | 4/2008 | Hickox et al. ................ 370/419 |
| 2008/0123610 A1* | 5/2008 | Desai et al. ................... 370/339 |
| 2008/0181203 A1* | 7/2008 | Jones et al. ................... 370/353 |
| 2009/0085603 A1 | 4/2009 | Paul et al. |
| 2009/0137206 A1* | 5/2009 | Sherman et al. ............. 455/41.2 |
| 2010/0296559 A1* | 11/2010 | Barbieri et al. ............... 375/222 |
| 2012/0142291 A1* | 6/2012 | Rath et al. .................. 455/127.1 |

* cited by examiner

US 9,237,096 B2

NETWORK RELAY APPARATUS

CROSS-REFERENCE TO RELATED APPLICATIONS

The present application claims priority to Japanese Patent Application No. 2011-277257 filed on Dec. 19, 2011, and No. 2012-238102 field on Oct. 29, 2012, the disclosures of which are hereby incorporated by reference in their entireties.

BACKGROUND OF THE INVENTION

1. Field of the Invention

The present invention relates to a network relay apparatus and more specifically to a technology of updating a programmable logic device included in the network relay apparatus.

2. Description of the Related Art

Recently, instead of ASICs (application specific integrated circuits) and software, programmable logic devices, for example, FPGA (field programmable gate array) that enables programming of its internal circuit and CPLD (complex programmable logic device) have often been used for implementation of the functions in network relay apparatuses, such as routers and switches.

Among the above programmable logic devices, SRAM-type FPGA generally downloads data called configuration data from a nonvolatile memory on its start-up and configures its internal circuit based on the downloaded data. This type of programmable logic device can readily modify and update the internal circuit by occasionally rewriting the configuration data stored in the nonvolatile memory. In the description hereinafter, the process of the programmable logic device that reads configuration data and configures its internal circuit is called "configuration".

As is known in the art, with increasing size reduction of semiconductor, a software error (changing data in a memory cell) often occurs, for example, by the effect of radiation in such a programmable logic device. Reconfiguration of the programmable logic device is needed on the occurrence of a software error in the programmable logic device. Reactivation of all the peripheral devices including the programmable logic device is generally required simultaneously with such reconfiguration. More specifically, the reconfiguration of the programmable logic device causes the values of all the interfaces included in the programmable logic device to become indefinite and thereby fails to ensure the operations of the peripheral devices. The reconfiguration also results in resetting information kept in the programmable logic device (e.g., configuration information and statistical information of the peripheral devices). It is accordingly needed to deactivate and reset the programmable logic device and its peripheral devices at the time of reconfiguration of the programmable logic device. When the programmable logic device subjected to such reconfiguration serves as a circuit to control the network interface unit of the network relay apparatus, the reactivation accompanied with the reconfiguration undesirably causes interruption of communication of the network relay apparatus.

One proposed technique to solve the above problem duplexes the programmable logic device, in order to avoid interruption of communication of the network relay apparatus (e.g., JP 2007-58419A).

This proposed technique avoids interruption of communication of the network relay apparatus during reconfiguration of the programmable logic device but requires duplexing the programmable logic device, which leads to the increasing cost and the complicated structure.

SUMMARY

In order to solve at least part of the foregoing, the object of the invention is to avoid interruption of communication of a network relay apparatus equipped with a programmable logic device during configuration of the programmable logic device without duplexing the programmable logic device.

According to one aspect of the invention, there is provided a network relay apparatus, comprising: a main controller configured to control respective parts of the network relay apparatus; a relay processor configured to identify a destination of a packet received via the network interface unit; and, a network interface unit configured to include: a plurality of line interfaces to which physical lines are respectively connected and send and receive a packet to and from outside of the network relay apparatus; a data storage configured to store circuit data; a programmable logic device by with a logic circuit having a predetermined function is realized; a configuration circuit configured to direct the programmable logic device to configure the logic circuit using the circuit data; and a state controller provided in a circuit structure other than the programmable logic device to control state of each of the plurality of line interfaces to one of an active state which allows data transmission and reception and a standby state which prohibits data transmission and reception.

In the network relay apparatus of the above aspect, the main controller may be connected with the configuration circuit by a control signal line through which a control signal for controlling the configuration circuit is transmitted. The main controller may also be connected with the programmable logic device by a control signal line through which a control signal for controlling the programmable logic device is transmitted.

The network relay apparatus of the above aspect enables the state controller not to be affected but to continue operation even during configuration of the programmable logic device. As a result, this effectively avoids interruption of communication of the network relay apparatus equipped with the programmable logic device during configuration of the programmable logic device without duplexing the programmable logic device.

The invention may be implemented by any of various applications other than the network relay apparatus described above, for example, a control method of a network relay apparatus, a computer program that enables the functions of any of such apparatus and method, and a storage medium in which such a computer program is recorded.

DESCRIPTION OF THE PREFERRED EMBODIMENT

The invention is described in detail below with reference to some embodiments with the accompanying drawings.

A. First Embodiment

A-1. General Structure of Network Relay Apparatus

Figure 1:
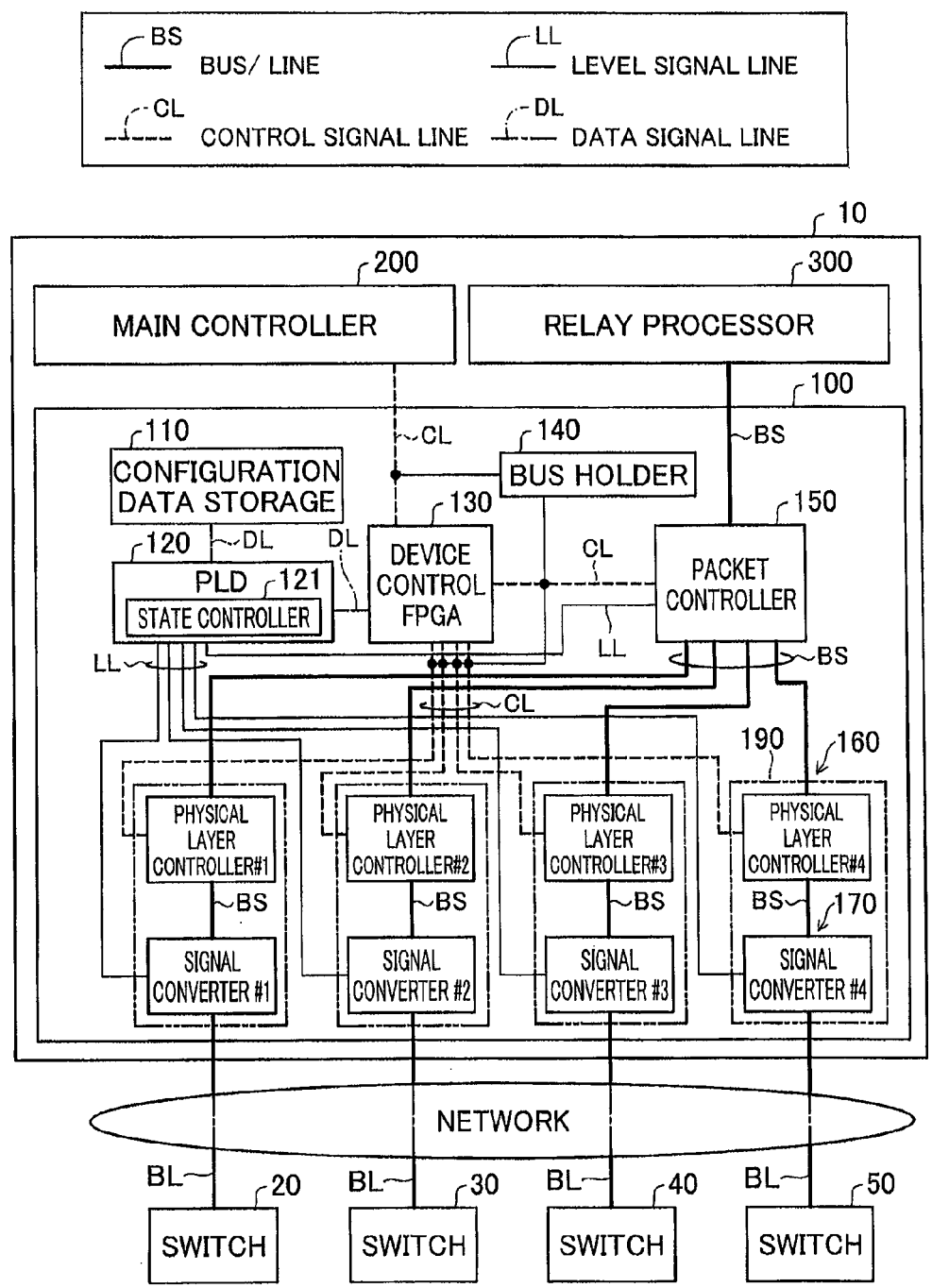
FIG. 1 illustrates the general structure of a switch according to one embodiment of the invention.

FIG. 1 illustrates the general structure of a switch 10 according to one embodiment of the invention. The switch 10 is a layer 3 network relay apparatus arranged and adapted to packet-based communication with another switch or a terminal connected with the switch 10. The switch 10 includes a network interface unit 100, a main controller 200 and a relay processor 300. The network interface unit 100 includes a configuration data storage 110, a PLD 120, a device control FPGA 130, a bus holder 140, a packet controller 150, physical layer controllers 160, signal converters 170, and line interfaces 190. The switch 10, the configuration data storage 110, the PLD 120 and the device control FPGA 130 of the embodiment respectively correspond to the "network relay apparatus", the "data storage", the "configuration circuit" and the "programmable logic device" in the claims.

The main controller 200 includes a CPU and memories such as ROM and RAM (not shown) and controls the respective parts of the switch 10 by software control. For example, the main controller 200 receives a command input from the administrator of the switch 10 and performs processing in response to the input command. The relay processor 300 includes a packet buffer, a destination identifier and a routing table (not shown) and performs a destination identification process for a packet input from the packet controller 150 of the network interface unit 100. More specifically, the destination identifier searches the routing table with the header information of a packet as the processing object temporarily stored in the packet buffer and identifies a forwarding destination of the packet.

The network interface unit 100 sends and receives packets to and from the outside of the switch 10 (i.e., switches 20 to 50). The configuration data storage 110 serves as a memory to store circuit data called configuration data. The configuration data storage 110 may be implemented by, for example, a non-volatile flash memory.

On the power supply of the switch 10 or in response to an instruction received from the main controller 200, the PLD 120 serves to read configuration data from the configuration data storage 110 and enable the device control FPGA 130 to configure a logic circuit (hereinafter this function is called "configuration"). The PLD 120 also serves to relay new configuration data forwarded from the main controller 200 to the configuration data storage 110. The PLD 120 may be implemented by, for example, an FPGA different from the device control FPGA 130, a CPLD or a microcomputer.

The PLD 120 includes a state controller 121. The state controller 121 switches a level signal to be supplied to each of the signal converters 170, so as to change the state of each of the line interfaces 190 between an active state that allows data transmission and reception (link up state) and a standby state that prohibits data transmission and reception and has the lower power consumption than that of the active state (link down state). According to this embodiment, the setting of "1" to the level signal to be supplied to the signal converter 170 means that the line interface 190 is in the active state (link up state), while the setting of "0" to the level signal means that the line interface 190 is in the standby state (link down state).

The device control FPGA 130 is provided as a programmable logic device having the size of, for example, several tens thousands gates and includes a large number of circuits including LUTs (look up table), selectors and flip-flops. The contents of the LUTs are kept in a volatile SRAM. On every power supply, the PLD 120 inputs the configuration data from the configuration data storage 110 and configures a logic circuit having predetermined functions inside the network interface unit 100 (configuration). According to the embodiment, this configuration configures a logic circuit, for example, a logic circuit that counts the number of forwarding packets as MIB (management information base) information or a logic circuit that collects and records failure information on lines and parts, as an internal circuit, in response to an instruction from the main controller 200.

The bus holder 140 fixes the settings of signals going through connected signal lines to a predetermined value (for example, "0" or "1"), so as to prevent malfunction. The packet controller 150 relays packets between the physical layer controllers 160 and the relay processor 300. More specifically, the packet controller 150 has a packet buffer (not shown) and is arranged and adapted to temporarily store a received packet in the packet buffer to absorb the speed difference between a bus connecting the packet controller 150 with the relay processor 300 and buses respectively connecting the packet controller 150 with the physical layer controllers 160.

The physical layer controller 160 and the signal converter 170 are included in the line interface 190. The physical layer controller 160 sends and receives control frames to and from a physical line controller of another switch connected with the switch 10 via the signal converter 170 and a physical line BL (hereinafter called "opposed switch"), so as to monitor the link state of the line between the switch 10 and the opposed switch. According to this embodiment, the physical layer controllers 160 include four physical layer controllers #1 to #4. The signal converter 170 is connected with the physical line BL and makes conversion between electrical signals and light signals to allow transmission and reception of packets through the connected physical line BL. According to this embodiment, the signal converters 170 include four signal converters #1 to #4.

In the network interface unit 100, the configuration data storage 110 is connected with the PLD 120 by a flash interface. The PLD 120 is respectively connected with the device control FPGA 130 by a data signal line DL and with the packet controller 150 and the respective signal converters 170 by level signal lines LL. The data signal line DL is used to send and receive configuration data. The level signal line LL is used to transmit the level signal for controlling the active state and the standby state of each of the line interfaces 190.

The device control FPGA 130 is respectively connected with the main controller 200, the packet controller 150 and the respective physical layer controllers 160 by control signal lines CL. The control signal line CL is used to transmit control packets as control information. The bus holder 140 is respectively connected with the control signal lines CL that connect the device control FPGA 130 with the respective parts. The packet controller 150 is respectively connected with the relay processor 300 and the respective physical layer controllers 160 by buses BS.

A-2. Operations for Updating Configuration Data

According to this embodiment, the configuration data of the device control FPGA 130 is updated in the following two cases:

(1) On the occurrence of a software error in the device control FPGA 130; and (2) When a function of the device control FPGA 130 is to be changed or to be added by changing an existing logic circuit realized in the device control FPGA 130.

The following sequentially describes the procedures in the respective cases.

A-2-1. Reconfiguration Process on the Occurrence of Software Error

Figure 2:
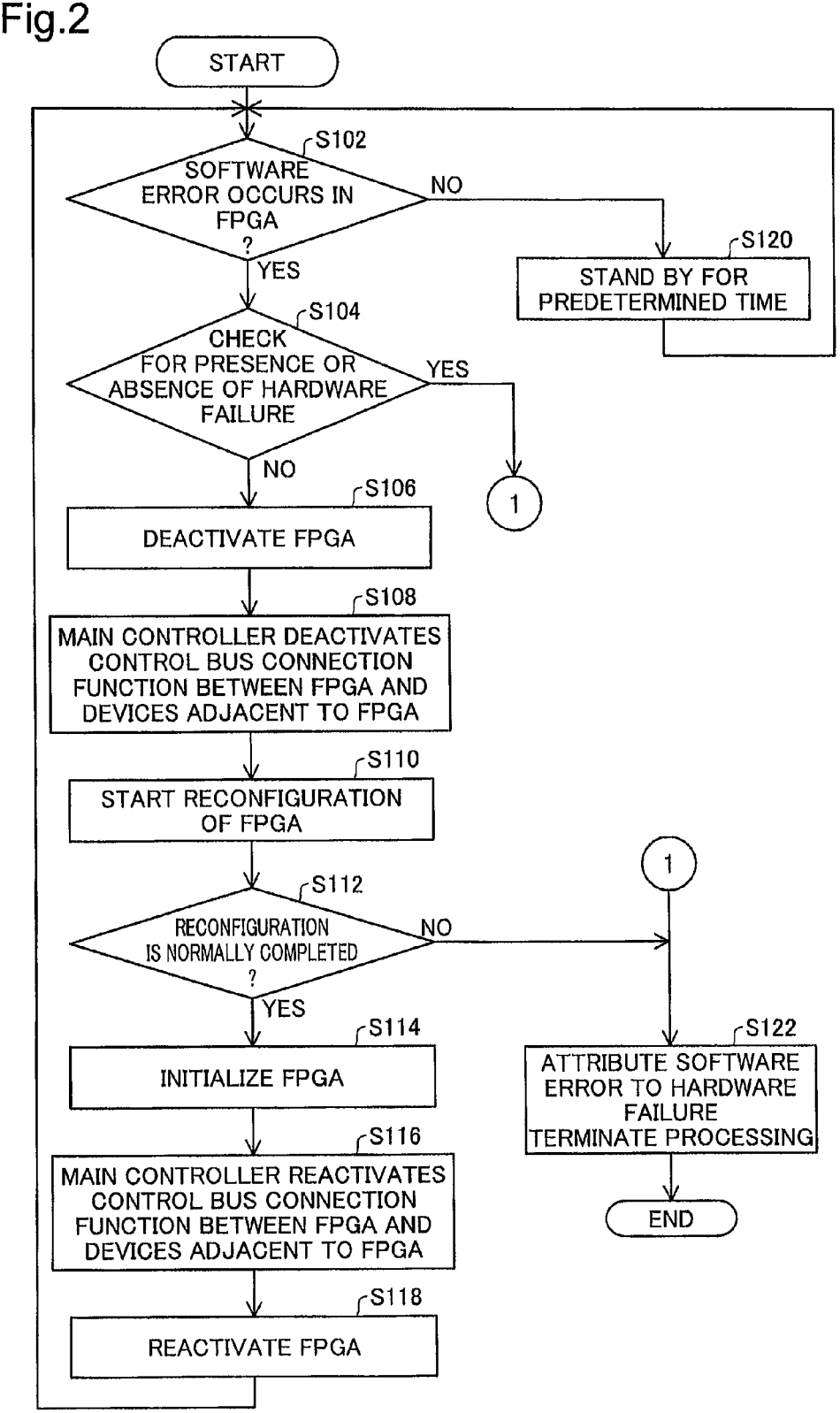
FIG. 2 is a flowchart showing a procedure of reconfiguration process on the occurrence of a software error.

FIG. 2 is a flowchart showing a procedure of reconfiguration process on the occurrence of a software error. The term "software error" in the embodiment hereof means that an internal memory of FPGA (field-programmable gate array: programmable logic device) has a bit error, which causes a change in data of a memory cell although the memory cell itself is not damaged.

The main controller 200 determines whether there is any software error occurring in the device control FPGA 130 (step S102). More specifically, the main controller 200 determines whether an interrupt is configured to notify of the occurrence of a software error. When it is determined that there is no software error (step S102: NO), the main controller 200 stands by for a predetermined time (step S120) and then returns the processing flow to step S102 to continue monitoring the occurrence of any software error.

When it is determined that there is a software error (step S102: YES), the main controller 200 checks the respective parts of the network interface unit 100 including the device control FPGA 130 for the presence or the absence of any hardware failure (step S104). More specifically, the main controller 200 refers to the settings of registers that store the operating conditions of the respective parts in the network interface unit 100, so as to check the presence or the absence of any hardware failure. When a hardware failure is detected as the result of the check (step S104: YES), the main controller 200 determines that the software error is attributed to the hardware failure in the network interface unit 100 and is thus not automatically recoverable and then terminates the processing flow (step S122). At this moment, it is preferable to send a notification of this fact to the administrator of the switch 10. The notification may adopt any of various methods, such as displaying a log, displaying alert, or sending a mail to a pre-registered address.

When no hardware failure is detected as the result of the check (step S104: NO), on the other hand, the main controller 200 deactivates the device control FPGA 130 and prepares for a start of reconfiguration (steps S106 and S108). More specifically, the main controller 200 sends an operation end request to the device control FPGA 130. When receiving the operation end request, the device control FPGA 130 deactivates its own functions (step S106) and deactivates the bus connection function between its own self provided by the configuration and the devices adjacent to its own self (for example, packet controller 150), so as to close bus connections (step S108).

Additionally, the bus holder 140 fixes the settings of control information running through the control signal lines CL, which the bus holder 140 is connected with, to either "0" or "1". This closes the bus connections prior to reconfiguration of the device control FPGA 130, in order to prevent malfunction of the devices adjacent to the device control FPGA 130.

After the deactivation of the device control FPGA 130, the main controller 200 starts reconfiguration of the device control FPGA 130 (step S110). More specifically, the main controller 200 provides instruction for reconfiguration of the device control FPGA 130 to the PLD 120. When receiving the instruction, the PLD 120 reads out the configuration data stored in the configuration data storage 110 and directs the device control FPGA 130 to configure its internal logic circuit (configuration).

The main controller 200 then determines whether reconfiguration of the device control FPGA 130 is normally completed (step S112). More specifically, the main controller 200 identifies whether a response representing normal completion of the reconfiguration of the device control FPGA 130 is received from the PLD 120, so as to determine the normal completion of the reconfiguration. When no response representing normal completion of the reconfiguration is received (step S112: NO), the main controller 200 determines that the software error is attributed to the occurrence of a hardware failure in the device control FPGA 130 and terminates the processing flow (step S122).

When the response representing normal completion of the reconfiguration is received (step S112: YES), on the other hand, the main controller 200 initializes the device control FPGA 130 (step S114). More specifically, the main controller 200 provides instruction for initializing the device control FPGA 130 to the device control FPGA 130. When receiving the instruction, the device control FPGA 130 reads out the settings and the internal information before the reconfiguration stored in the ROM of the main controller 200. The device control FPGA 130 then sets the read-out settings and internal information in its own self.

After the initialization, the main controller 200 reactivates the device control FPGA 130 (steps S116 and S118). More specifically, the main controller 200 sends an operation start request to the device control FPGA 130. When receiving the operation start request, the device control FPGA 130 reactivates the bus connection function between its own self provided by the configuration and the devices adjacent to its own self, so as to restart the bus connections (step S116). The device control FPGA 130 then reactivates its own functions (step S118). Additionally, the bus holder 140 cancels the fixation of the signal settings on the control signal lines CL by the bus holder 140. After the reactivation of the device control FPGA 130, the main controller 200 returns the processing flow to step S102 to continue monitoring the occurrence of any software error.

A-2-2. Reconfiguration Process Accompanied with Function Change or Addition

Figure 3:
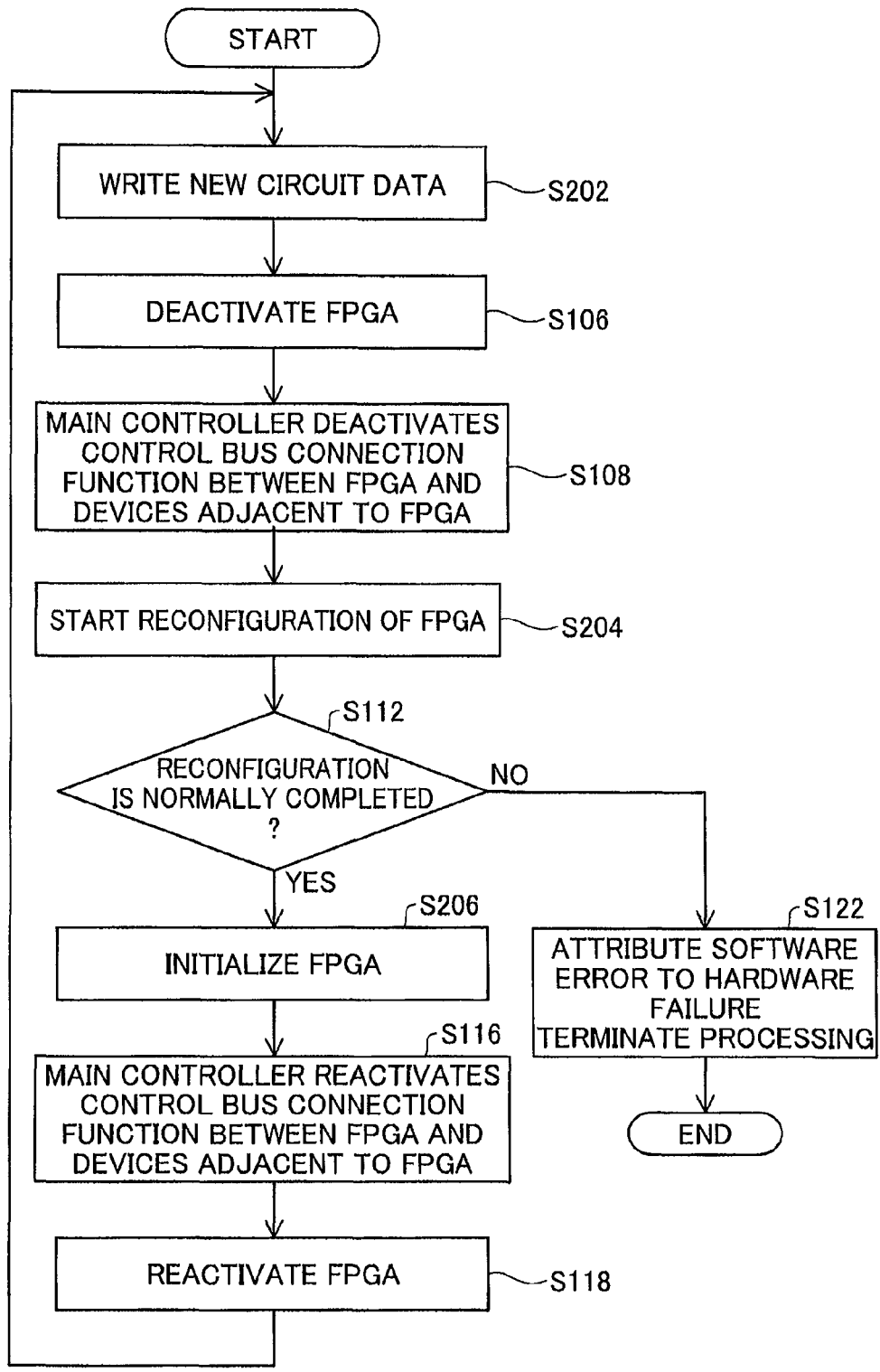
FIG. 3 is a flowchart showing a procedure of reconfiguration process accompanied with a function change or addition.

FIG. 3 is a flowchart showing a procedure of reconfiguration process accompanied with a function change or addition. The differences from the reconfiguration process on the occurrence of a software error shown in FIG. 2 include replacement of steps S102 and S104 with step S202, replacement of step S110 with step S204, and replacement of step S114 with step S206, and the other steps are similar to those of FIG. 2.

At step S202, the main controller 200 writes new configuration data for configuring a logic circuit after a change into the configuration data storage 110 via the device control FPGA 130 and the PDL 120. In this writing step, the main controller 200 may overwrite the old configuration data with new configuration data or may move the old configuration data to a backup area in the configuration data storage 110 without overwriting the old configuration data. At step S202, it is preferable to perform a comparison check, in order to check whether the writing into the configuration data storage 110 is adequately completed.

After the deactivation of the device control FPGA 130, the main controller 200 starts reconfiguration of the device control FPGA 130 (step S204). More specifically, the main controller 200 provides instruction for reconfiguration of the device control FPGA 130 to the PLD 120. When receiving the instruction, the PLD 120 reads out the new configuration data stored in the configuration data storage 110 and directs the device control FPGA 130 to configure its internal logic circuit (configuration). The configuration data stored in the configuration data storage 110 has been updated to the new configuration data at step S202. A new logic circuit corresponding to the contents of the new configuration data is accordingly realized in the device control FPGA 130 at step S204.

When receiving a response representing normal completion of the reconfiguration at step S112, the main controller 200 initializes the device control FPGA 130 (step S206). More specifically, the main controller 200 provides instruction for initializing the device control FPGA 130 to the device control FPGA 130. When receiving the instruction, the device control FPGA 130 reads out the settings and the internal information before the reconfiguration stored in the ROM of the main controller 200 and sets the read-out settings and internal information in its own self.

At step S206, the device control PFGA 130 may set default settings and default internal information, instead of the settings and the internal information before the reconfiguration. The defaults may be stored with the new configuration data in the ROM of the main controller 200. The device control FPGA 130 may set the settings and the internal information before the reconfiguration merged with the default settings and the default internal information. This enables the device control FPGA 130 to operate with the defaults even when there is a difference in required settings and internal information between an old logic circuit before the reconfiguration and a new logic circuit after the reconfiguration.

Figure 4:
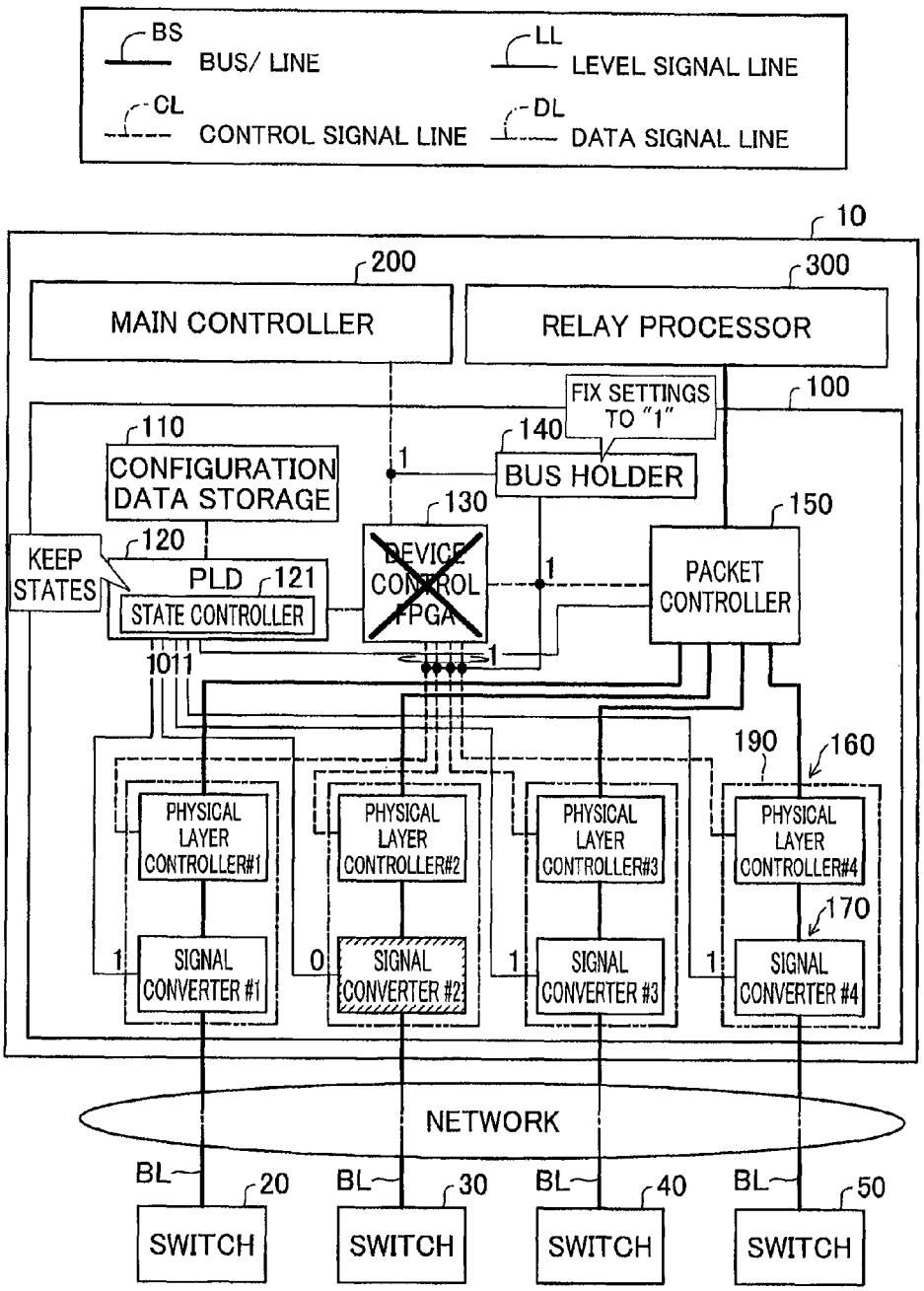
FIG. 4 illustrates the conditions of the respective parts in the switch during configuration.

FIG. 4 illustrates the conditions of the respective parts in the switch 10 during configuration. The device control FPGA 130 is deactivated for the purpose of configuration. The bus holder 140 fixes the settings of control information running through the control signal lines CL to "1", in order to prevent the control signals going through the control signal lines CL from being disturbed by the deactivation of the device control FPGA 130 to cause malfunction of the respective parts connected with the control signal lines CL. In this state, the PDL 120 continues operation, so that the state controller 121 provided in the PLD 120 can continue supply of level signals to the signal converters 170. The supply of the level signals keeps the signal converters #1, #3 and #4 (line interfaces #1, #3 and #4) in the active state, while keeping the signal converter #2 (line interface #2) in the standby state. The on-off states of light output in the signal converters 170 (line interfaces 190) are accordingly kept unchanged before and after the configuration of the device control FPGA 130.

According to the structure of the first embodiment described above, the state controller 121 of controlling the state of each of the line interfaces 190 to either the active state that allows data transmission and reception or the standby state that prohibits data transmission and reception is provided in the circuit structure other than the device control FPGA 130 (programmable logic device) in the network interface unit 100 of the switch 10 (network relay apparatus). The state controller 121 is accordingly not affected but is allowed to continue operation even during the configuration of the device control FPGA 130. In other words, the on-off states of light output in the signal converters 170 (line interfaces 190) are kept unchanged before and after the configuration of the device control FPGA 130. As a result, the switch 10 equipped with the device control FPGA 130 can avoid interruption of communication (off of light output) during the configuration of the device control FPGA 130 without duplexing of the device control FPGA 130.

Avoiding the interruption of communication of the switch 10 during the configuration leads to preventing detection of unexpected on-off of light output in the opposed switch. When unexpected on-off of light output is detected in the opposed switch, the administrator of the opposed switch is generally supposed to investigate the cause of the occurrence of this unexpected event to be attributed to a defect in the opposed switch or to a defect in another switch. The switch 10 is connected with a large number of other apparatuses via the network, so that a failure of light output from the switch 10 affects the large number of other apparatuses. It is thus desirable to make every effort to prevent the failure of light output from the switch 10.

According to the first embodiment, on the occurrence of a software error in the device control FPGA 130 (programmable logic device), the main controller 200 directs the PLD 120 (configuration circuit) to reconfigure the device control FPGA 130 or more specifically to reconfigure a logic circuit realized in the device control FPGA 130. As a result, the switch 10 (network relay apparatus) can automatically reconfigure the logic circuit in the device control FPGA 130 on the occurrence of a software error in the device control FPGA 130. This improves the availability of the switch 10.

According to the first embodiment, the bus holder 140 fixes the settings of the control information transmitted through the control signal lines CL to the predetermined value during at least reconfiguration of the device control FPGA 130 (i.e., during reconfiguration of the logic circuit). This effectively prevents malfunction of the device control FPGA 130 and the circuits connected therewith (e.g., packet controller 150 and physical layer controllers 160) in the switch 10 (network relay apparatus) during the reconfiguration of the device control FPGA 130. Additionally, fixation of the settings of the control information running through the control signal lines CL to "1" by the bus holder 140 enables the packet controller 150 and the physical layer controllers 160 to continue the respective processing operations even during the reconfiguration of the device control FPGA 130.

In the conventional structure where level signal lines LL are connected with the device control FPGA 130, for example, another possible method of avoiding the interruption of communication (off of light output) during the configuration of the device control FPGA 130 may connect the bus holder 140 with the level signal lines LL to fix the settings of the level signals to "1" representing the active state during the configuration. This method, however, keeps all the line interfaces 190 in the active state during the configuration of the device control FPGA 130 independently of the active/standby settings of the respective line interfaces 190 by the administrator of the switch 10. This may lead to detection of unexpected on-off of light output in the opposed switch.

B. Second Embodiment

The structure of allowing the quicker recovery on the occurrence of a software error in a device control FPGA is described as a second embodiment of the invention. The following mainly describes only the different structure and operations from those of the first embodiment. The like components to those of the first embodiment are expressed by the like numerical and alphabetical symbols to those of the first embodiment and are not specifically described here.

B-1. General Structure of Network Relay Apparatus

Figure 5:
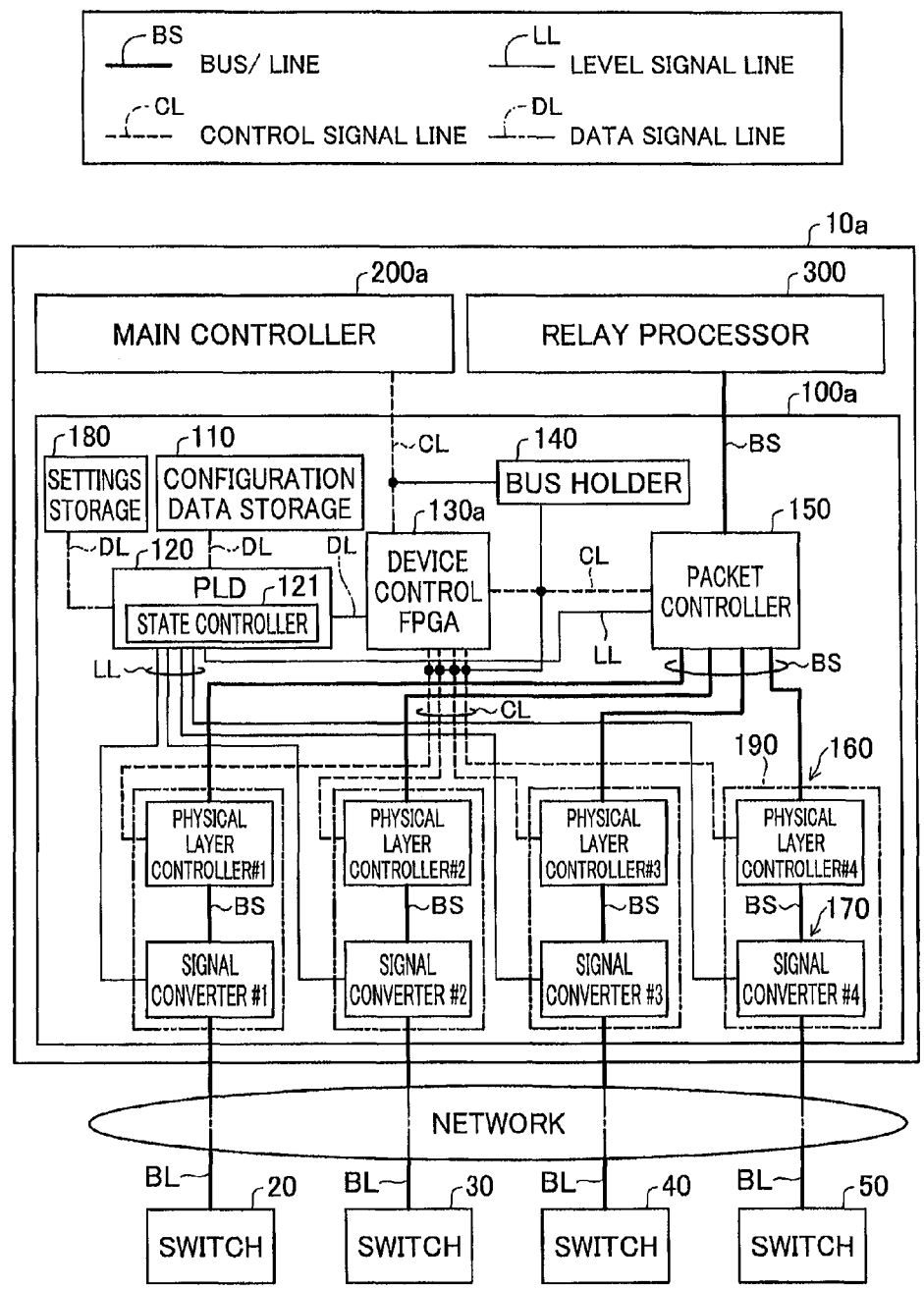
FIG. 5 illustrates the general structure of a switch according to the second embodiment.

FIG. 5 illustrates the general structure of a switch 10a according to the second embodiment. The differences from the first embodiment shown in FIG. 1 include replacement of the network interface unit 100 with a network interface unit 100a and replacement of the main controller 200 with a main controller 200a, and the other structure is similar to that of the first embodiment. The network interface unit 100a includes a device control FPGA 130a, in place of the device control FPGA 130. The network interface unit 100a additionally has a settings storage 180.

The settings storage 180 is a memory serving to store the settings and the internal information, which is used for initialization of the device control FPGA 130a after configuration. The settings storage 180 may be implemented by, for example, a nonvolatile flash memory. The settings storage 180 is connected with the PLD 120 by a flash interface.

B-2. Operations for Updating Configuration Data

Like the first embodiment described above, according to the second embodiment, the configuration data of the device control FPGA 130a is updated in the following two cases:

(1) On the occurrence of a software error in the device control FPGA 130a; and (2) When a function of the device control FPGA 130a is to be changed or to be added by changing an existing logic circuit realized in the device control FPGA 130a.

The procedure in the case (2) is identical with that described in the first embodiment and is thus not specifically described here. The following describes the procedure in the case (1).

B-2-1. Reconfiguration Process on the Occurrence of Software Error

Figure 6:
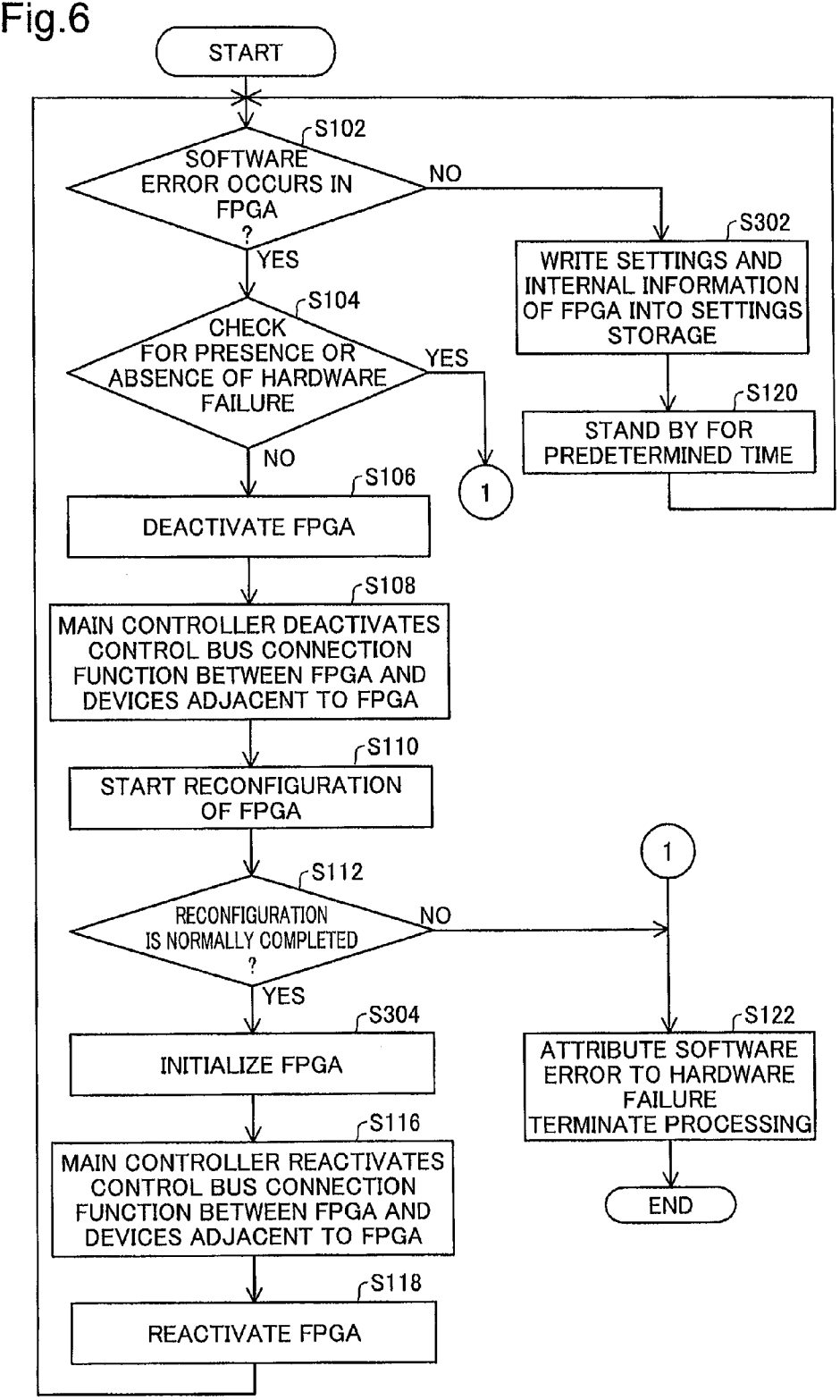
FIG. 6 is a flowchart showing a procedure of reconfiguration process on the occurrence of a software error.

FIG. 6 is a flowchart showing a procedure of reconfiguration process on the occurrence of a software error. The differences from the first embodiment shown in FIG. 2 include addition of step S302 before step S120 and replacement of step S114 with step S304, and the other steps are similar to those of FIG. 2.

When it is determined that there is no software error (step S102: NO), the main controller 200a directs the device control FPGA 130a to write the settings (step S302). More specifically, the main controller 200a provides instruction for writing the settings and the internal information to the device control FPGA 130a. When receiving the instruction, the device control FPGA 130a writes the settings set in its own self and the internal information into the settings storage 180 via the PLD 120. In this writing step, the device control FPGA 130a may overwrite the old settings and internal information with the new settings and internal information or may move the old settings and internal information to a backup area in the settings storage 180 without overwriting the old settings and internal information. After the writing step, the main controller 200a stands by for a predetermined time (step S120) and then returns the processing flow to step S102 to continue monitoring the occurrence of any software error and writing the settings and the internal information.

When the response representing normal completion of the reconfiguration is received at step S112, the main controller 200a initializes the device control FPGA 130a (step S304). More specifically, the main controller 200a provides instruction for initializing the device control FPGA 130a to the device control FPGA 130a. When receiving the instruction, the device control FPGA 130a reads out the settings and the internal information stored in the settings storage 180 and sets the read-out settings and internal information in its own self. The main controller 200a then continues the series of processing after the initialization of the device control FPGA 130a (step S304).

According to the structure of the second embodiment described above, the main controller 200a stores at least one of the latest settings and the latest internal information set in the device control FPGA 130a into the settings storage 180 at regular intervals during a period with no occurrence of a software error in the device control FPGA 130a (programmable logic device). The switch 10a (network relay apparatus) can thus automatically obtain the backup of at least the settings and the internal information used for initialization of the device control FPGA 130a.

Additionally, according to the structure of the second embodiment, after the reconfiguration of the device control FPGA 130a (i.e., reconfiguration of the logic circuit), the main controller 200a initializes the device control FPGA 130a using at least one of the settings and the internal information stored in the settings storage 180. As a result, the switch 10a (network relay apparatus) can automatically initialize the device control FPGA 130a using the backup of the previously obtained settings and internal information. The settings storage 180 is a memory area provided inside the network interface unit 100a. The initialization using the settings stored in the settings storage 180 accordingly takes a shorter time for setting, compared with the initialization using the settings stored in the main controller 200a. This accordingly shortens the total time required for error recovery of the switch 10a.

C. Detailed Structure of Network Relay Apparatus

Figure 7:
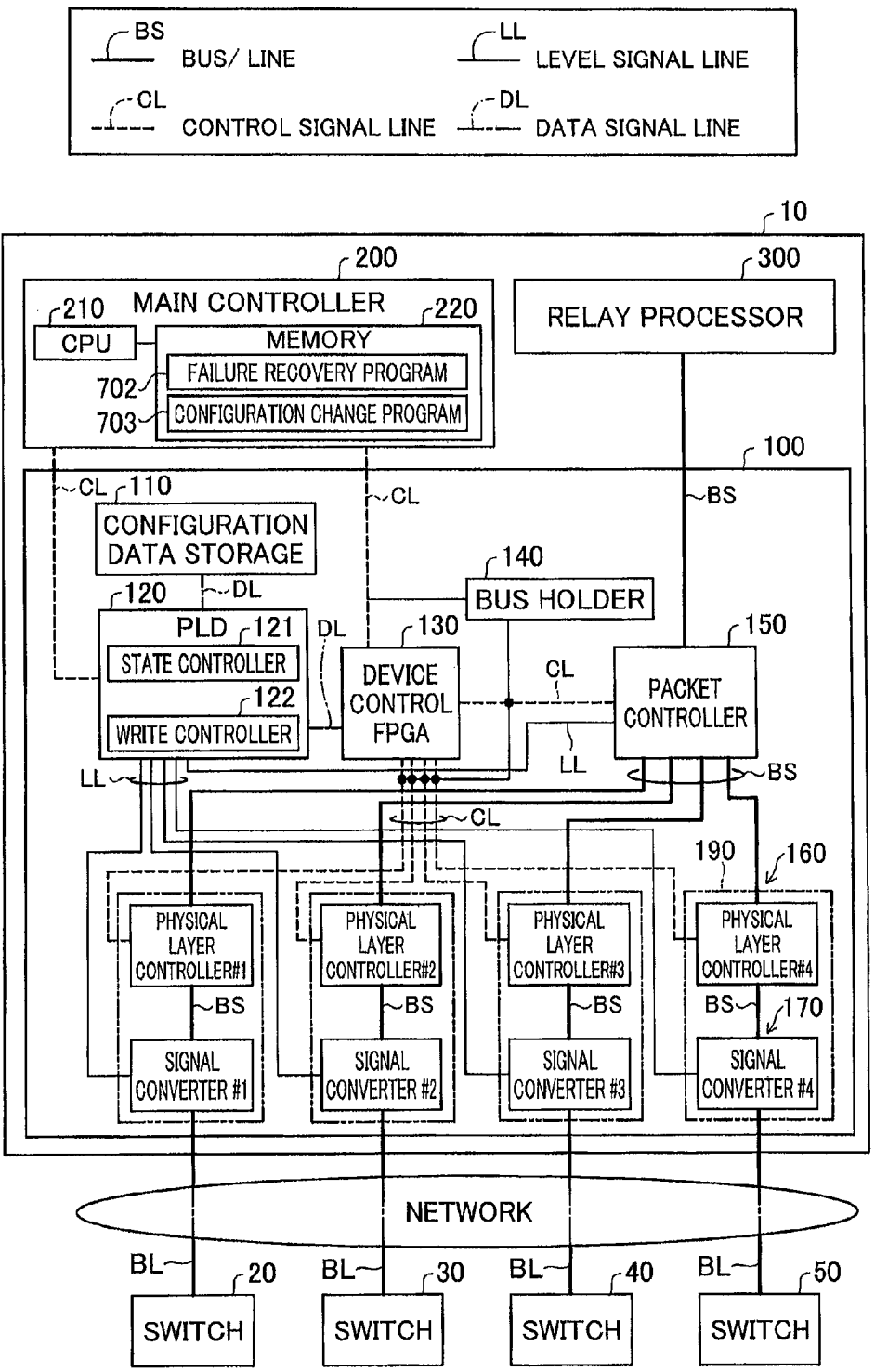
FIG. 7 illustrates the detailed structure of the switch of the first embodiment.

FIG. 7 illustrates the detailed structure of the switch 10 of the first embodiment. The differences from FIG. 1 are explicit illustration of a CPU 210 and a memory 220 included in the main controller 200, storage of a failure recovery program 702 and a configuration change program 703 in the memory 220, a write controller 122 included in the PLD 120 and a control signal line CL between the main controller 200 and the PLD 120.

The respective functions of the main controller 200 may be implemented by execution of a computer program stored in the memory 220 by the CPU 210. More specifically, among the functions of the main controller 200, the function of reconfiguration process on the occurrence of a software error described above with reference to FIG. 2 may be implemented by the CPU 210 that reads and executes the failure recovery program 702 stored in the memory 220. Similarly, the function of reconfiguration process accompanied with a function change or addition described above with reference to FIG. 3 may be implemented by the CPU 210 that reads and executes the configuration change program 703 stored in the memory 220.

The configuration function of the PLD 120, i.e., the function of the PLD 120 that reads the configuration data from the configuration data storage 110 and causes the device control FPGA 130 to configure a logic circuit may be implemented by the write controller 122 of the PLD 120. The various instructions, e.g., the instruction for configuration, are sent from the main controller 200 to the PLD 120 via the control signal line CL arranged to connect the main controller 200 with the PLD 120.

D. Modifications

The invention is not limited to the above embodiments but various modifications and variations may be made to the embodiments without departing from the scope of the invention. For example, the functions implemented by the software configuration may be implemented by the hardware configuration. Some examples of other possible modifications are given below.

D1. Modification 1

The above embodiments illustrate the exemplified structures of the network relay apparatus. The structure of the network relay apparatus is, however, not limited to those of the above embodiments but may be specified arbitrarily in the range without departing from the scope of the invention. For example, the network relay apparatus may be arranged and adapted to include other function parts or tables (not shown) or may be arranged and adapted without some of the illustrated function parts.

For example, the state controller is provided in the PLD in the structures of the above embodiments. The state controller may, however, be provided in any circuit structure other than the programmable logic device, for example, in a packet controller or in an exclusive LSI.

In another example, the bus holder may be omitted from the structures of the above embodiments.

More specifically, the switch 10 shown in FIG. 7 may be arranged and adapted without the bus holder 140. In this modification, the process executed by the bus holder 140 of the first embodiment, i.e., the process of fixing the signal settings to a predetermined value to prevent malfunction may be replaced by level signals supplied by the state controller 121. The structure of the switch 10 of the first embodiment may thus be simplified by omitting the bus holder 140 from the switch 10.

In yet another example, the switch having the structure of the above embodiment may be arranged and adapted to support another function, such as link aggregation.

D2. Modification 2

The two cases (1: on the occurrence of a software error; and 2: when a function of the programmable logic device is to be changed or added) when the switch updates the configuration data are described in the above embodiments. The timings of updating the configuration data are, however, not limited to these two cases.

For example, the operation of updating the configuration data may be performed at the time of manufacturing the switch product, may be performed by a command or an instruction from the administrator of the switch, or may be performed according to a schedule specified in advance by the administrator. In the application of automatically updating the configuration data at regular intervals, it is preferable to perform the update during hours with the lower processing load of the switch (for example, during midnight).

D3. Modification 3

The exemplified procedures of reconfiguration processes are described in the above embodiments. These procedures of the embodiments are, however, only illustrative and may be changed and modified in various ways. Some of the steps may be omitted, or other steps may be added. The execution sequence of the steps may be changed.

For example, in the reconfiguration process on the occurrence of a software error according to the second embodiment (FIG. 6), the main controller may write the settings and the internal information set in the programmable logic device into the settings storage in the case of a change of at least one of the settings and the internal information set in the programmable logic device, in addition to during the period with no occurrence of a software error. Even in the case of a change of the settings or the internal information in the programmable logic device, this enables the switch to automatically obtain the backup of the settings or the internal information after the change.

D4. Modification 4

The invention may also be implemented by any of the following aspects:

According to a first aspect, there is provided a network relay apparatus including: a main controller configured to control respective parts of the network relay apparatus; a network interface unit configured to send and receive a packet to and from outside of the network relay apparatus; and a relay processor configured to identify a destination of a packet received via the network interface unit. The network interface unit includes: a plurality of line interfaces to which physical lines are respectively connected; a data storage configured to store circuit data; a programmable logic device by with a logic circuit having a predetermined function is realized; a configuration circuit configured to direct the programmable logic device to configure the logic circuit using the circuit data; and a state controller provided in a circuit structure other than the programmable logic device to control state of each of the plurality of line interfaces to one of an active state and a standby state, wherein the active state allows data transmission and reception, and wherein the standby state that prohibits data transmission and reception. The main controller is connected with the configuration circuit by a control signal line through which a control signal for controlling the configuration circuit is transmitted. The main controller is connected with the programmable logic device by a control signal line to which a control signal for controlling the programmable logic device is transmitted. In the network relay apparatus of this aspect, the state controller of controlling the state of each of the line interfaces to either the active state that allows data transmission and reception or the standby state that prohibits data transmission and reception is provided in the circuit structure other than the programmable logic device in the network interface unit of the network relay apparatus. This enables the state controller to be not affected but to continue operation even during configuration of the programmable logic device. As a result, the network relay apparatus equipped with the programmable logic device can avoid interruption of communication during the configuration of the programmable logic device without duplexing the programmable logic device. The main controller is connected with the configuration circuit and with the programmable logic device by the control signal lines. The main controller can thus control the configuration of the programmable logic device.

According to a second aspect, there is provided a network relay apparatus including: a main controller configured to control respective parts of the network relay apparatus; a network interface unit configured to send and receive a packet to and from outside of the network relay apparatus; and a relay processor configured to identify a destination of a packet received via the network interface unit. The network interface unit includes: a plurality of line interfaces to which physical lines are respectively connected; a data storage configured to store circuit data; a programmable logic device by with a logic circuit having a predetermined function is realized; a configuration circuit configured to direct the programmable logic device to configure the logic circuit using the circuit data; and a state controller provided in a circuit structure other than the programmable logic device to control state of each of the plurality of line interfaces to one of an active state and a standby state, wherein the active state allows data transmission and reception, and wherein the standby state prohibits data transmission and reception. In the network relay apparatus of this aspect, the state controller of controlling the state of each of the line interfaces to either the active state that allows data transmission and reception or the standby state that prohibits data transmission and reception is provided in the circuit structure other than the programmable logic device in the network interface unit of the network relay apparatus. This enables the state controller to be not affected but to continue operation even during configuration of the programmable logic device. As a result, the network relay apparatus equipped with the programmable logic device can avoid interruption of communication during the configuration of the programmable logic device without duplexing the programmable logic device.

According to a third aspect, there is provided the network relay apparatus, wherein each of the plurality of line interfaces may be connected with the programmable logic device by a control signal line through which control information for controlling each of the plurality of line interfaces is transmitted, and each of the plurality of line interfaces may be connected with the state controller by a level signal line through which a level signal for controlling the state of each of the line interfaces to one of the active state and the standby state is transmitted. In the network relay apparatus of this aspect, the control of the active state or the standby state in each of the line interfaces may thus be performed by the state controller provided in the circuit structure other than the programmable logic device, while the other control in each of the line interfaces may be performed by the programmable logic device.

According to a fourth aspect, there is provided the network relay apparatus, wherein the state controller may be provided in the configuration circuit. In the network relay apparatus of this aspect, the control of the active state or the standby state in each of the line interfaces may thus be performed by the configuration circuit, which directs the programmable logic device to configure a logic circuit.

According to a fifth aspect, there is provided the network relay apparatus, wherein the main controller may direct the configuration circuit to reconfigure the logic circuit realized in the programmable logic device on occurrence of a software error in the programmable logic device. In the network relay apparatus of this aspect, the main controller causes the configuration circuit to reconfigure the logic circuit realized in the programmable logic device on the occurrence of a software error in the programmable logic device. As a result, this network relay apparatus can automatically reconfigure the logic circuit in the programmable logic device on the occurrence of a software error in the programmable logic device.

According to a sixth aspect, there is provided the network relay apparatus, wherein the network interface unit may further include a bus holder connected with the control signal line and configured to enable setting of a signal, which is transmitted through a signal line connected with the bus holder, to be fixed to a predetermined value, and the bus holder may fix setting of the control information, which is transmitted through the control signal line, to a predetermined value during at least reconfiguration of the logic circuit. In the network relay apparatus of this aspect, the bus holder fixes the setting of the control information, which is transmitted through the control signal line, to a predetermined value during at least reconfiguration of the logic circuit. This network relay apparatus can thus effectively prevent malfunction of the programmable logic device and the circuits connected therewith accompanied with the reconfiguration of the logic circuit in the programmable logic device.

According to a seventh aspect, there is provided the network relay apparatus, wherein the network interface unit may further include a settings storage that stores at least one of a setting and internal information used for initialization of the programmable logic device that is performed after configuration of the logic circuit, and the main controller may store at least one of a latest setting and latest internal information set in the programmable logic device into the settings storage at regular intervals during a period with no occurrence of a software error in the programmable logic device. In the network relay apparatus of this aspect, the main controller stores at least one of the latest setting and the latest internal information set in the programmable logic device into the settings storage at regular intervals during a period with no occurrence of a software error in the programmable logic device. This network relay apparatus can thus automatically obtain the backup of at least the setting and the internal information used for initialization of the programmable logic device.

According to an eighth aspect, there is provided the network relay apparatus, wherein in the case of a change of at least one of the setting and the internal information set in the programmable logic device, the main controller may store the setting and the internal information after the change into the settings storage. In the network relay apparatus of this aspect, in the case of a change of at least one of the setting and the internal information set in the programmable logic device, the main controller stores the setting and the internal information after the change into the settings storage. This network relay apparatus can thus automatically obtain the backup of at least one of the setting and the internal information after the change.

According to a ninth aspect, there is provided the network relay apparatus, wherein the main controller may initialize the programmable logic device using at least one of the setting and the internal information stored in the settings storage after reconfiguration of the logic circuit. In the network relay apparatus of this aspect, the main controller performs the initialization using at least one of the setting and the internal information stored in the settings storage after the reconfiguration of the logic circuit. This network relay apparatus can thus automatically initialize the programmable logic device using the backup of the setting and the internal information obtained in advance.

According to the embodiments and the aspects described above, the state controller of controlling the state of each of the line interfaces to either the active state that allows data transmission and reception or the standby state that prohibits data transmission and reception is provided in the circuit structure other than the programmable logic device in the network interface unit of the network relay apparatus. This enables the state controller to be not affected but to continue operation even during configuration of the programmable logic device. As a result, the network relay apparatus equipped with the programmable logic device can avoid interruption of communication during the configuration of the programmable logic device without duplexing the programmable logic device. The main controller is connected with the configuration circuit and with the programmable logic device by the control signal lines. The main controller can thus control the configuration of the programmable logic device.

What is claimed is:
1. A network relay apparatus, comprising:
 a processor;
 a memory connected to the processor storing instructions to cause the processor to identify a destination of a packet received via a network interface unit, the network interface unit connected to the processor, the network interface unit including:
  a plurality of line interfaces to which physical lines are respectively connected and which send and receive a packet to and from outside of the network relay apparatus;
  a data storage area configured to store circuit data;
  a programmable logic device with a logic circuit having a predetermined function;

a configuration circuit configured to direct the programmable logic device to configure the logic circuit using the circuit data; and a state controller provided in a circuit structure other than the programmable logic device to control states of each of the plurality of line interfaces to one of an active state which allows data transmission and reception and a standby state which prohibits data transmission and reception, wherein the memory further stores instructions to cause the processor to control the network interface unit, and wherein the programmable logic device is connected with the processor via a first control signal line through which a first control signal is transmitted and the programmable logic device is controlled in response to the first control signal.

2. The network relay apparatus according to claim 1, wherein
the configuration circuit is connected with the processor via a second control signal line through which a second control signal is transmitted, and
the configuration circuit is controlled in response to the second control signal.

3. The network relay apparatus according to claim 2, wherein
the processor controls a configuration of the programmable logic device with the first control signal.

4. The network relay apparatus according to claim 1, wherein
each of the plurality of line interfaces is connected with the programmable logic device by a control signal line through which control information for controlling each of the plurality of line interfaces is transmitted, and
each of the plurality of line interfaces is connected with the state controller by a level signal line through which a level signal for controlling the states of each of the line interfaces to one of the active state and the standby state is transmitted.

5. The network relay apparatus according to claim 1, wherein
the state controller is provided in the configuration circuit.

6. The network relay apparatus according to claim 1, wherein
the processor directs the configuration circuit to reconfigure the logic circuit of the programmable logic device on occurrence of a software error in the programmable logic device.

7. The network relay apparatus according to claim 4, wherein the network interface unit further includes:
a bus holder connected with the control signal line and configured to enable setting of information, which is transmitted through a signal line connected with the bus holder, to be fixed to a predetermined value, and
the bus holder fixes setting of the control information, which is transmitted through the control signal line, to a predetermined value during at least reconfiguration of the logic circuit.

8. The network relay apparatus according to claim 1, wherein
the network interface unit further includes:
a memory storing at least one of a setting and internal information used for initialization of the programmable logic device that is performed after configuration of the logic circuit, and
the processor stores at least one of a latest setting and latest internal information set in the programmable logic device into the settings storage area at regular intervals during a period with no occurrence of a software error in the programmable logic device.

9. The network relay apparatus according to claim 8, wherein
when at least one of the setting and the internal information set in the programmable logic device are changed, the processor stores the setting and the internal information after the change into the memory.

10. The network relay apparatus according to claim 8, wherein
the processor initializes the programmable logic device using at least one of the setting and the internal information stored in the memory after reconfiguration of the logic circuit.

* * * * *